(Model.)
R. STEPHENS.
RATCHET DRILL.
No. 291,419. Patented Jan. 1, 1884.
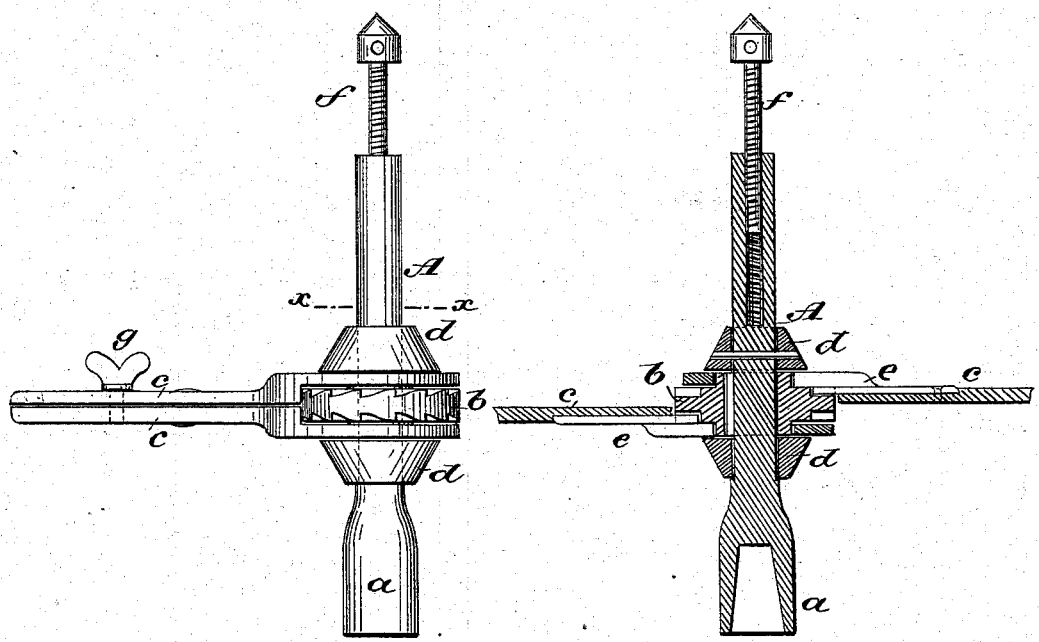
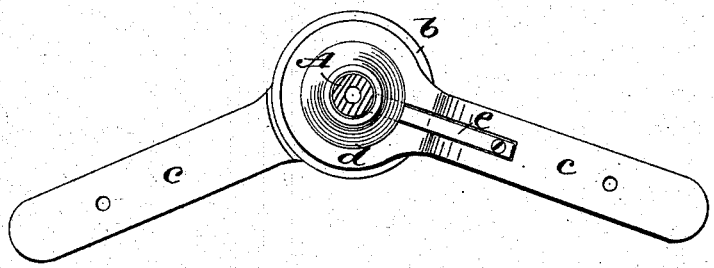
WITNESSES:
Francis McArdle
C. Sedgwick
INVENTOR:
R. Stephens
BY Munn & Co
ATTORNEYS.

UNITED STATES PATENT OFFICE.

RICHARD STEPHENS, OF NEGAUMEE, MICHIGAN.

RATCHET-DRILL.

SPECIFICATION forming part of Letters Patent No. 291,419, dated January 1, 1884.

Application filed May 1, 1883. (Model.)

*To all whom it may concern:*

Be it known that I, RICHARD STEPHENS, of Negaumee, in the county of Marquette and State of Michigan, have invented a new and Improved Ratchet-Drill, of which the following is a full, clear, and exact description.

My invention consists in a double-acting ratchet-brace, constructed with two handles, so that almost a continuous movement can be imparted to the drill, as hereinafter described and claimed.

Reference is to be had to the accompanying drawings, forming a part of this specification, in which similar letters of reference indicate corresponding parts in all the figures.

Figure 1 is a side elevation of my improved ratchet-brace. Fig. 2 is a longitudinal section of the same. Fig. 3 is a cross-section on the line $x\ x$, Fig. 1.

A is the stem or shank of the brace, formed with a socket portion, $a$, for receiving the drill.

$b$ is the ratchet-block, and $c\ c$ are the handles. The block $b$ is keyed fast upon the shank A, and is formed with ratchet-teeth at opposite sides. The two handles are loose upon the shank—one at each side of the block $b$—and are held in place by washers $d$, attached to the shank A. The handles are provided with pawls $e\ e$, engaging the teeth of the ratchet-block. $f$ is a screw tapped in the end of the shank A, for feeding the drill. $g$ is a thumb-screw, which is to be used for connecting the two handles together, as shown in Fig. 1, when they are to be used as a single handle. With the two handles fastened together, as shown in Fig. 1, the brace can be used in the ordinary manner. When the handles are turned out at opposite sides, as shown in Figs. 2 and 3, they are to be moved backward and forward simultaneously, and by this operation their pawls will engage alternately with the ratchet-teeth of the block, one acting when the handles are moving back and the other one when they are moving forward, so that an almost continuous rotation will be given to the brace and drill, and a hole can thus be bored very rapidly, and without the loss of time that takes place with an ordinary single-handed brace.

By using a set-screw instead of a key, as shown, for securing the upper collar, $d$, the hole for screw $f$ can be run in lower and the shank shortened.

I am aware that it is not new to use a reciprocating lever having teeth within the eye of its boss to drive a ratchet-wheel on the brace-stem. Also, that it is not new to drive separate ratchets by alternately-operating pawls; but, to the best of my knowledge and belief, no one has so combined mechanism that the same brace may be driven by either the simultaneous or alternating movement; hence,

What I claim as new is—

The combination, with the brace-stem A and opposite washers, $d\ d$, made fast thereto, of the rigidly-keyed block $b$, having teeth in the same direction on its opposite edges, and the loose match-handles $c\ c$, carrying pawls $e\ e$, said handles being adapted to be clamped together and operate as a unit, or separated and operate alternately, as described.

RICHARD STEPHENS.

Witnesses:
WILLIAM N. MORSE,
SIDNEY P. KLINE.